United States Patent [19]

Hagglund

[11] Patent Number: 4,962,874

[45] Date of Patent: Oct. 16, 1990

[54] NOTEPAD HOLDER FOR AUTOMOBILES

[75] Inventor: Erik Hagglund, New Canaan, Conn.

[73] Assignee: Tretten, Inc., New Canaan, Conn.

[21] Appl. No.: 336,889

[22] Filed: Apr. 12, 1989

[51] Int. Cl.⁵ .............................................. B60R 7/00
[52] U.S. Cl. .............................. 224/277; 224/42.46 R; 224/282; 16/225
[58] Field of Search .......... 224/42.43, 42.44, 42.46 R, 224/273, 277, 282; 281/44, 45; 108/44; 16/225

[56] References Cited

U.S. PATENT DOCUMENTS

| | | | |
|---|---|---|---|
| 1,637,485 | 8/1927 | Hiering | 281/44 X |
| 2,150,709 | 3/1939 | Bake | 224/277 X |
| 2,862,328 | 12/1958 | Wadsworth | 108/44 |
| 3,326,268 | 6/1967 | Dixon | 16/225 X |
| 3,713,578 | 1/1973 | Johnson | 16/225 X |
| 4,577,788 | 3/1986 | Richardson | 224/273 |
| 4,628,572 | 12/1986 | Chang | 24/67.11 |
| 4,762,258 | 8/1988 | Murphy | 224/273 |

FOREIGN PATENT DOCUMENTS 948125  8/1956  Fed. Rep. of Germany ... 224/42.44

Primary Examiner—Henry J. Recla
Assistant Examiner—R. M. Fetsuga
Attorney, Agent, or Firm—Eric Y. Munson; Mark P. Stone

[57] ABSTRACT

The present invention provides a notepad holder for automobiles which may be mounted directly to the windshield of a car for viewing by the driver during operation of the motor vehicle or for making notes during times when the vehicle is momentarily stopped. The notepad holder includes a base which is removably mounted to the inner surface of the windshield of a motor vehicle by at least two separate mounting locations. The base includes a clamp for removably holding a pad or other writing material, and further includes a compartment for holding a pen or other writing implement.

11 Claims, 2 Drawing Sheets

FIG. 1A
(PRIOR ART)
FIG. 1B
(PRIOR ART)
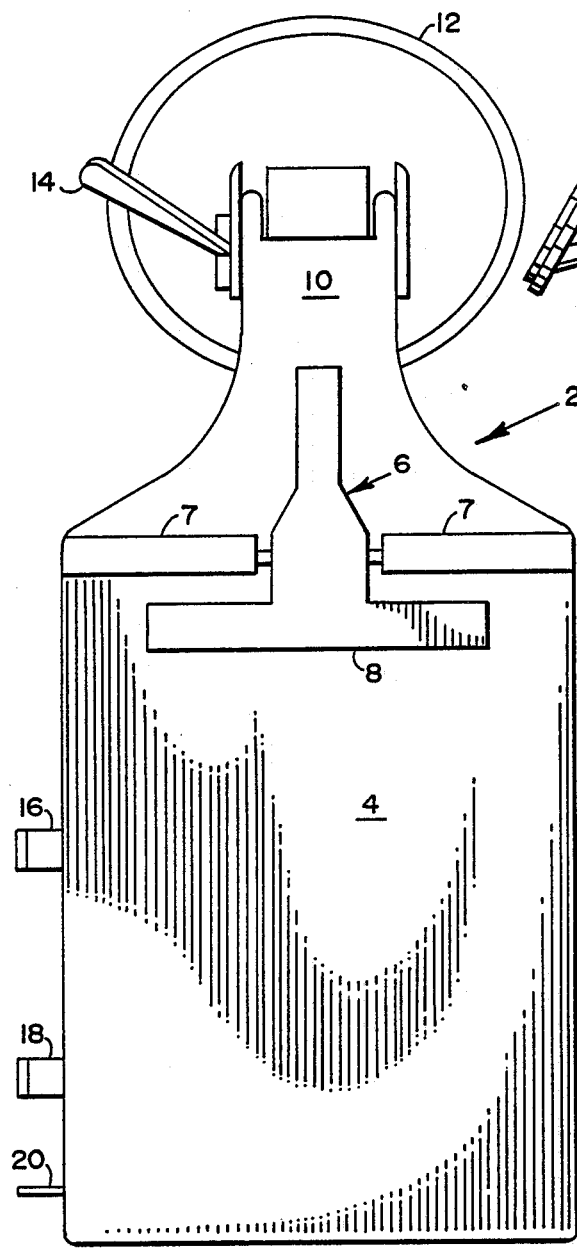
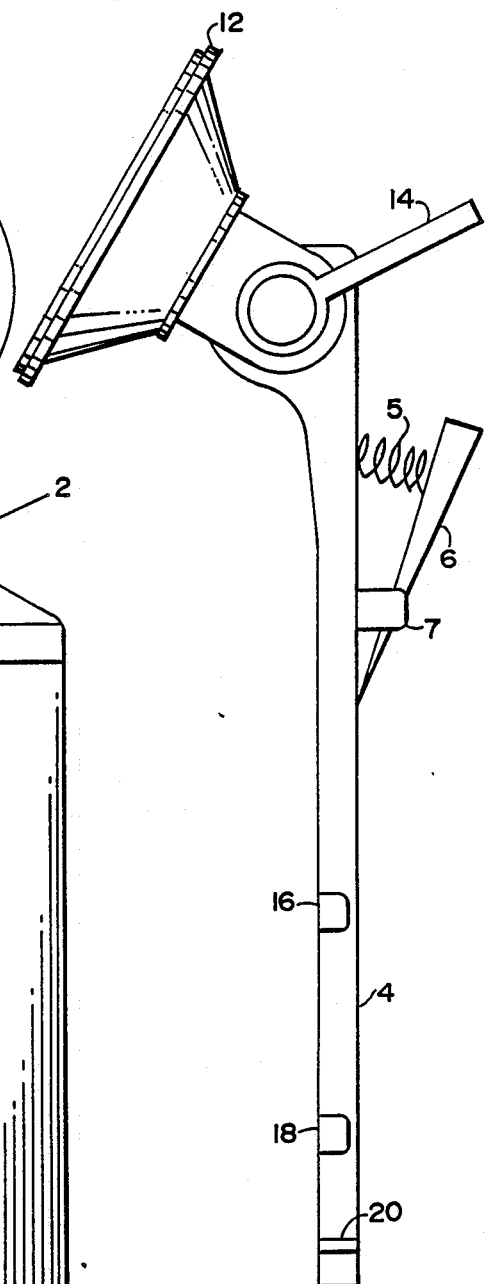

NOTEPAD HOLDER FOR AUTOMOBILES

BACKGROUND OF THE INVENTION

It is common for drivers of cars to refer to written notes during times when the vehicle is in operation. In particular, drivers on occasion are required to refer to written travel directions when travelling to an unfamiliar location. It is usually dangerous to stop a vehicle on the shoulder of a road in order to refer to written notes since a stopped vehicle, particularly on a high speed highway, may be hit by other vehicles. Additionally, on some of the more rural roads which do not have any side shoulders or have side shoulders insufficient to fully accomodate a stopped vehicle, it is obviously dangerous for a driver to stop a vehicle or pull to the side of the roadway to refer to written directions since the vehicle will extend onto the roadway.

To avoid the above discussed problem, it is common, particularly in Europe, to mount a notepad to the windshield of a vehicle so that a driver may briefly glance at written notes on the pad when necessary. The notepad is generally mounted to the inner surface of the front windshield within the field of view of the driver, but in a position which does not obstruct the driver's direct line of sight. The driver may momentarily glance at the written directions while still concentrating and viewing the road conditions ahead.

The notepad holder also enables a driver to make written notes when the vehicle is momentarily stopped at a traffic light and the like. The notepad holder includes means for holding a writing implement so that both a pad and a writing implement are readily and conveniently accessible to the driver for making some brief notes. In this manner, the driver will not be concentrating on remembering his thoughts until the end of the trip and thus can devote his full attention to driving.

In the known devices for mounting a notepad to the windshield of an automobile, the notepad is generally mounted to a flat, rectangular base which includes a clamp for removably retaining the pad or other writing material. A suction cup is mounted to the upper end of the base, and the base and the writing pad are retained on the inner surface of the automobile windshield by suction. However, there are several disadvantages to this type of structure and the mounting arrangement. In the first instance, changes in environmental conditions, such as changes in temperature which may be experienced by a vehicle at different times of the day or in different geographical locations, will adversely affect the suctional forces holding the mounting structure to the inner surface of the windshield. If, for example, the base and the pad were to suddenly dislodge from the windshield, the driver of the vehicle might be surprised and react with a jerking motion which might result in a vehicular accident. Additionally, the effectiveness of the suctional mounting arrangement varies with the surface of the windshield on which the backboard is mounted. Dirt, grease or grime will adversely affect the strength of the suctional engagement, rendering it difficult to mount the backboard to the inner surface of the windshield for prolonged periods of time. Moreover, the known suction cup type mounting devices mount the backboard to the inner surface of a windshield at only a single mounting position. Accordingly, if the single point of suctional contact fails, the entire base and pad will fall from the windshield. As noted above, if this occurs suddenly during the operation of a vehicle, it might surprise the driver and result in a dangerous condition.

It is the primary object of the present invention to provide a improved notepad holder to be mounted to the inner surface of the front windshield of an automobile.

SUMMARY OF THE INVENTION

In accordance with the present invention, a base for a notepade to be mounted to the inner surface of a windshield of an automobile includes at least two arms extending upwardly from the base, the upper ends of each of the arms being adapted to be mounted to different positions on the inner surface of the windshield. In this manner, the notepad and its supporting base are mounted to the windshield at two separate and independent contact points of engagement. In the event that the grip fails at one point, the engagement between the other arm and the windshield will maintain the base and the pad mounted to the windshield until such time as the operator of the vehicle is able to re-secure the disengaged arm. In this manner, the possibility of the notepad and its supporting base abruptly falling from the windshield to the surprise of the driver is greatly reduced.

Preferably, the upper flexible ends of the projections or arms which extend upwardly from the base of the notepad include an adhesive material adapted to removably grip the inner surface of the windshield at the desired mounting locations. This material may include VELCRO type adhesive strips having the engaging surfaces facing inwardly towards the inner surface of the windshield. A pair of complimentary VELCRO type adhesive strips are mounted directly to the inner surface of the windshield (as for example, by adhesive means) with the engaging surfaces facing outwardly from the inner windshield surface. The strips mounted to the windshield are spaced apart a distance corresponding to the distance between the complimentary strips carried by the projections on the base of the notepad holder so that the strips on the windshield and the strips on the holder are in axial alignment with each other respectively. The strips are mounted to the inner surface of the car windshield at a position in which the notepad will be mounted to the windshield within the field of view of the driver of the vehicle but not directly blocking his forward vision.

The upper ends of the projections or arms may be flexibly joined to lower arm portions extending upwardly from the top of the base. The upper ends of the arms, which carry the adhesive material or VELCRO type adhesive strips, will be provided with a rigid or reinforced backing, as for example cardboard or sheet metal, to enhance the engagement between the adhesive material carried by the upper arm portions and the complimentary mounting material on the windshield of the automobile. The reinforced backing is provided on the forward facing surfaces of the upper arm portions opposite the surfaces facing the windshield when the base is mounted thereon. A space is defined between the reinforced upper arm portions and the lower arm portions extending from the base so as to provide enough flexibility to allow for angular motion between the upper and lower arm portions so as to allow the notepad holder to take an angular position relative to the windshield to allow for its support against the dashboard at an angle suitable for writing. The upper and lower arm portions may be joined together by a strip of flexible material. It is further within the scope of the invention that the rigid backing of the upper arm portion can be one part of a hinge, the other part of the hinge being used for attachment to the lower arm portions extending upwardly from the base by riveting, glueing or by other suitable means. Other conventional means for providing pivoting movement of the lower arm and base relative to the upper arm portion may also be employed.

It is within the scope of the invention to employ means other than VELCRO type adhesive strips or adhesive materials to mount the notepad to the windshield, provided that more than a single point of mounting contact is provided. For example, the notepad base may be mounted to the inner surface of the windshield of the vehicle using a plurality of suction cups positioned at different points along the base, by conventional magnetic means, or by "snap-on" techniques.

Preferably, the base includes a clamp for removably retaining a notepad, and means for holding a pen or other writing implement. The clamp itself may also function as the retaining means for the writing implement associated with the device.

BRIEF DESCRIPTION OF THE DRAWINGS

FIG. 1A of the drawing is a front elevational view of a prior art notepad mounting base adapted to be mounted to the inside of a windshield of a motor vehicle by a single suction cup;

FIG. 1B is a right side elevational view of FIG. 1A;

DESCRIPTION OF THE BEST MODES FOR CARRYING OUT THE INVENTION

Figure 2:
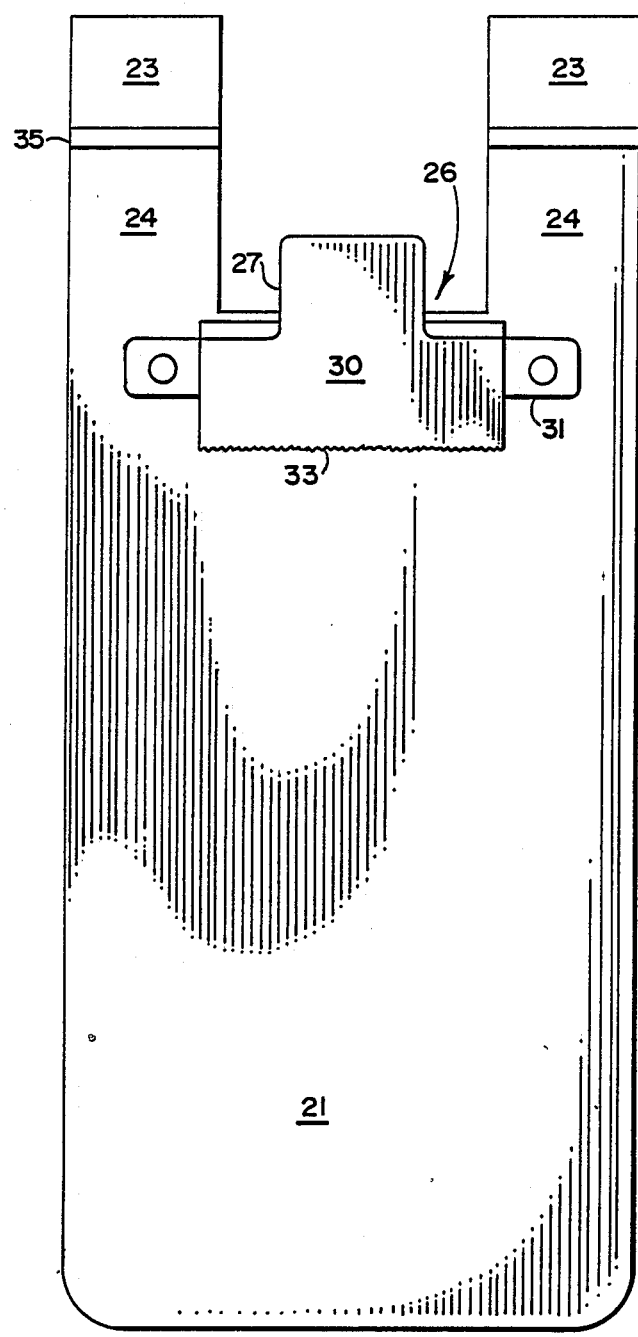
FIG. 2 of the drawings illustrates a front elevational view of an embodiment of the notepad mounting base of the present invention by which the base may be removably mounted to the inner surface of the windshield of a motor vehicle at more than one engagement point.

FIGS. 1A and 1B of the drawing illustrate a known prior art notepad holder adapted to be removably mounted to the inner surface of the windshield of a motor vehicle. The known device is generally illustrated by reference numeral 2 and includes a generally flat rectangular base 4. A clamp 6 is mounted to the upper portion of the base 4, and is spring biased by a spring 5 around a hinge 7 in a direction so that the clamping end 8 of the clamp engages the front surface of the base 4. A pad or other writing material (not shown in the drawings) may be removably mounted to the base by the clamp 6.

The base 4 tapers upwardly into a top end 10 and a suction cup device 12 is pivotably mounted to the base at its upper end 10. A lever 14 operatively associated with the suction cup device 12 is adapted to firmly press and then pull an inner layer of elastic material such as rubber (not shown in the drawings) against and then away from a surface to which the device is to be mounted for the purpose of evacuating air from within the suction cup to create the suction force necessary to mount the device to the desired surface.

A pair of brackets 16 and 18, and a lower ledge or stop member 20 are mounted to one side of the base 4 in axial alignment with each other. A writing implement such as a pen or a pencil (not shown in drawing) may be retained in the brackets 16 and 18 by frictional engagement and supported by the lower ledge so that the writing implement is stored near the pad retained on the base 4 by the clamp 6.

In operation of the prior art device, the suction cup is pressed against the inner surface of the windshield of an automobile in a predetermined position such that the writing pad mounted to the base 4 will be in a desired position relative to the operator of the vehicle. As previously discussed, the operator may mount instructions or directions to which he might refer during a trip to the base 4, or may use the pad and writing implement on the base to write down notes or reminders during times when the vehicle is momentarily halted. As also discussed, the main disadvantage of the known prior art device illustrated by FIG. 1 is that the base is mounted to the windshield of the vehicle at only one point of contact, and the effectiveness of the suctional engagement of the device at the single point of contact may be adversely affected by the surface conditions of the windshield, the temperature of the windshield, the moisture content of the windshield and other environmental conditions.

Figure 3:
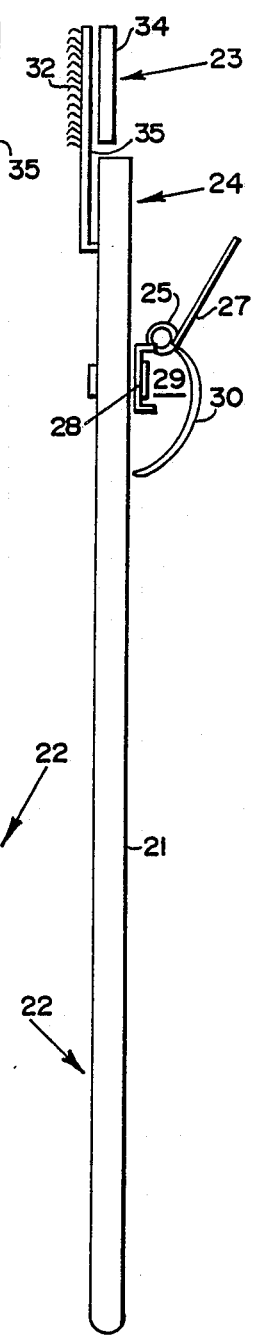
FIG. 3 is a side elevational view of FIG. 2.

FIGS. 2 and 3 of the drawing illustrate the preferred embodiment of the present invention which is an improvement over the known prior art device discussed herein. More specifically, the notepad mounting device 22 of FIGS. 2 and 3 discloses a generally rectangular planer base 21, having two separate and spaced apart upwardly extending opposed arms 24. The base 21 is preferably formed from a rigid material such as plastic, or cardboard enclosed within a plastic sleeve. A clamp 26 is mounted near the upper portion of the base but below the upwardly extending arms 24. The clamp includes a pivotable jaw portion 30, an actuator arm 27 integrally joined to the top of the jaw portion, and a stationary base 28 which defines a lateral channel. The clamp is spring biased by a spring 25 exerting an upward force on the clamp actuator arm 27 to removably mount a notepad or other writing material (not shown) to the front surface 21 of the base 22. The clamp is designed so as to define a space 29 between its stationary base 28 and the pivotable clamping jaw 30 so as to accommodate a writing implement inserted laterally into the clamp when the clamp is closed, yet still retain a notepad removably mounted to the front surface 21 of the base 22.

Use of the clamp to retain both the notepad and the writing implement eliminates the need to provide separate retaining means for each of these two elements as exemplified by the known prior art device discussed above. The present invention accomplishes this dual function by utilizing an arcuate shaped movable clamping member 30 which together with the clamp base 28, defines an inner hollow area 29 for receiving and removably retaining a writing implement therein. The writing implement is dimensioned so that it may be slid in and out of the hollow area or channel 29 defined by the clamp base 28 which is closed on top by the arcuate jaw 30. As can be seen from FIG. 2, the lower portion of the movable clamp jaw 30 is a serrated jaw to firmly grip a pad or other writing material and securely hold it against the outer surface 21 of the base 22. The serrated lower portion 33 of the jaw extends downwardly beyond the lower portion 31 of the clamp base 28 so that the lower portion of the clamp base provides a stop for the upper end of a notepad or other writing material retained within the clamp 26. In this manner, the hollow area 29 defined within the clamp for retaining a writing implement will not be obstructed by the notepad or writing material also retained by the clamp 30. It should be noted that the writing implement is held in a horizontal position which is perpendicular to the travel direction of the automobile which is desirable from a safety standpoint.

The arms 24 extend upwardly from the opposed sides of the base and thus are symetrically oriented to enhance mounting stability. Where more than two points of contact are provided the contact points are preferably equidistantly spaced apart from each other and uniformly linearly distributed over the base.

Still referring to FIGS. 2 and 3, the top portions 23 of the upwardly extending opposed arms 24 of the base include means for removably mounting the base to the inside of a windshield of a motor vehicle. A strip of VELCRO type adhesive material 32 may be mounted to the rear surface of each of the top portions 23 of the arms 24 so as to be oriented in a direction toward the inner surface of the windshield on which the base is to be mounted. Complimentary VELCRO type adhesive strips are permanently mounted to the inner surface of the windshield at predetermined locations and spaced a predetermined distance apart from each other to correspond to the spacing of the complimentary Velcro adhesive strips carried by the arms 24. The base may be mounted to the inner surface of the windshield by aligning the adhesive material carried by the inner surface of the arms 24 with the complimentary strips of material mounted to the windshield, and pressing the strip on each arm into mounting engagement with the corresponding strip on the windshield. In this manner, the base will be removably mounted to a predetermined location on the inner surface of the windshield as desired by the user and may be dismounted when the vehicle is not in use. Preferably, the outer surface of the top arm portions 23 include a layer of reinforcing material 34, as for example cardboard or sheet metal, to rigidify the top arm portions 23 and enhance the grip between the VELCRO type adhesive strips carried on the inner surfaces of the top arm portions 23 and the complementary VELCRO type adhesive strips mounted to the inner surface of the windshield. In all embodiments, the top arm portions 23 are flexibly joined to the arms 24 extending upwardly from the base, as for example, by a flexible connecting strip 35. In this manner, the lower portions of the arms 24 and the base 22 are pivotable relative to the top arm portions 23 so as to angularly move the base into a position abutting against a portion of the dashboard proximate to the base to provide support for writing at the proper angle. As also seen in FIG. 3, a space is defined between the top of the lower arm portions and the bottom of the upper arm portions to fascilitate pivotal movement.

The opposed arms 24 may be formed integrally with the base 22 or extend integrally therefrom. In one alternative, the arms may be formed from strips of material, preferably flexible, which are joined to the base. The base 22 is preferably pivotal relative to the arms 24 (which can be accomplished by forming the arms from flexible material, or by other conventional means). As was also previously discussed, the upper and lower portions of the arms 24 may be spaced apart and jointed together by a flexible strip to provide pivotal movement between the base and the windshield surface to which the upper arms 23 are affixed, as shown in FIG. 3.

Although the preferred embodiment of the invention as discussed above employs Velcro material to mount the base to the inside of the windshield, other mounting means may be used. For example, adhesive means, magnetic means, snap on devices or suction devices may be employed to mount the arms 24 to complementary mounting means permanently attached to the inside of a windshield at a plurality of predetermined mounting positions. The complementary mounting means attached to the inner surface of a car windshield may be permanently mounted thereon by one-sided adhesive tape or other conventional mounting means. A measuring strip (not shown in the drawing) may be provided for measuring the space between the opposed arms 24 extending upwardly from the base in order to mount the complimentary mounting means affixed to the inner surface of the car windshield at the proper spacing to match the spacing between the arms 24.

A significant aspect of the present invention is that the base is mounted to the inner surface of the car windshield at more than a single point of engagement. Accordingly, in the event that the grip at one point fails, the base will still remain mounted to the windshield as a result of the engagement at the other contact points. Although the embodiment of the invention disclosed in the drawing illustrates two contact points for mounting engagement, it is within the scope of the invention to provide a greater number of engagement points. The use of more than a single mounting engagement point enhances the overall stability and efficiency of the mounting arrangement, and avoids or reduces the possibility of the base suddenly disengaging from the windshield and abruptly falling down from the windshield, which might startle the operator of the vehicle and result in an unsafe situation.

Although the preferred embodiment of the invention advocates the mounting of the notepad base at a desired position on the inner surface of the windshield of a motor vehicle (preferably, at an elevation near the top of the dashboard so that the dashboard may be used as a writing support), it is within the scope of the invention to mount the base at any desired location within the vehicle which is accessible to the driver. For example, the base may be mounted to any suitable surface on the dashboard itself or on the instrument panel within the vehicle proximate to and accessible by a vehicle operator.

Other advantages, modifications and variations of the invention will become apparent to those skilled in the art. Accordingly, the description of the best modes for carrying out the invention provided herein are intended illustrative only, and not restrictive of the scope of the invention, that scope being defined by the following claims and all equivalents thereto.

I claim:

1. A device for mounting writing material to an inner surface of a windshield of a motor vehicle, said device comprising:
    a base having a top end portion, a bottom end portion, a front surface, and a rear surface,
    clamp means mounted to the front surface of said base for removably retaining said writing material against said front surface of said base,
    at least two separate arm portions extending upwardly from said top end portion of said base, each of said arm portions having front and rear surfaces and including a lower arm portion connected to said base and an upper arm portion connected to said lower arm portion by a flexible material for allowing pivoting of said base relative to said upper arm portions;

at least two separate mounting elements adapted to be affixed to said inner surface of said windshield of said motor vehicle, and said rear surfaces of said upper arm portions having means thereon for removably mating with said two separate mounting elements thereby mounting said base to said inner surface of said windshield.

2. The device of claim 1 wherein said means for mounting includes a layer of VELCRO type adhesive material affixed to the rear surface of each of said at least two upper arm portions, and said at least two separate mounting elements each include a layer of VELCRO type adhesive material for mounting said device to said inner surface of said windshield.

3. The device of claim 1 wherein said means for mounting includes an adhesive layer affixed to the rear surface of each of said at least two upper arm portions.

4. The device of claim 1 wherein each of said at least two upper arm portions includes a reinforcing layer on said front surface thereof for stiffening each of said at least two portions.

5. The device of claim 1 wherein the distance between said two upwardly extending portions is substantially equal to the width of said base.

6. The device of claim 1 wherein said base includes two opposed lateral sides, and said at least two portions are respectively spaced the same distances away from their respective adjacent sides of said base.

7. The device of claim 1 wherein said two portions are symmetrically oriented relative to said base.

8. The device of claim 1 wherein said base is substantially rectangular.

9. The device of claim 1 wherein said clamp includes a stationary clamp base and a jaw pivotably mounted above said clamp base, said clamp base and jaw defining a space therebetween for removably retaining a writing implement.

10. The device of claim 9 wherein said jaw is arcuately shaped to define said space for receiving said writing implement.

11. The device of claim 9 wherein said clamp base includes a lower edge defining stop means, and said jaw extends below said stop means such that said stop means prevents writing material retained by said clamp from obstructing said space defined for receiving said writing implement.

* * * * *